(12) United States Patent
Cheng et al.

(10) Patent No.: US 9,366,870 B2
(45) Date of Patent: *Jun. 14, 2016

(54) WEARABLE DISPLAY APPARATUS

(71) Applicants: Dewen Cheng, Beijing (CN); Yongtian Wang, Beijing (CN); Yue Liu, Beijing (CN)

(72) Inventors: Dewen Cheng, Beijing (CN); Yongtian Wang, Beijing (CN); Yue Liu, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,899

(22) Filed: Jun. 3, 2015

(65) Prior Publication Data

US 2015/0268474 A1   Sep. 24, 2015

Related U.S. Application Data

(63) Continuation of application No. 14/294,394, filed on Jun. 3, 2014, now Pat. No. 9,052,505, which is a continuation of application No. PCT/CN2012/085987, filed on Dec. 6, 2012.

(30) Foreign Application Priority Data

Dec. 6, 2011   (CN) .......................... 2011 1 0404197

(51) Int. Cl.
*G02B 27/14*   (2006.01)
*G02B 9/00*   (2006.01)
*G02F 1/00*   (2006.01)
*G02B 27/01*   (2006.01)
*G02B 27/22*   (2006.01)
*H04N 13/04*   (2006.01)
*H04N 13/00*   (2006.01)
*G02B 5/04*   (2006.01)

(52) U.S. Cl.
CPC .............. *G02B 27/0172* (2013.01); *G02B 5/04* (2013.01); *G02B 27/225* (2013.01); *H04N 13/0033* (2013.01); *H04N 13/044* (2013.01); *H04N 13/0443* (2013.01); *H04N 13/0459* (2013.01); *G02B 2027/0114* (2013.01); *G02B 2027/0125* (2013.01); *H04N 2213/001* (2013.01)

(58) Field of Classification Search
USPC ......... 359/630–633, 649–655, 245, 248, 900; 353/31, 85, 94, 121
See application file for complete search history.

(56) References Cited

U.S. PATENT DOCUMENTS

| | | | | |
|---|---|---|---|---|
| 8,427,731 B2* | 4/2013 | Laino et al. | ............ | 359/245 |
| 2009/0153752 A1* | 6/2009 | Silverstein | ............ | 348/750 |
| 2014/0300873 A1* | 10/2014 | Miyamoto et al. | ............ | 353/102 |

* cited by examiner

*Primary Examiner* — Mohammed Hasan
(74) *Attorney, Agent, or Firm* — Syncoda LLC; Feng Ma

(57) ABSTRACT

A display apparatus includes a planar waveguide optical element, a projection optical system, and a microdisplay device. By including free-form optics and waveguide technology, the volume and weight of the display apparatus can be reduced, and an optical system can be realized with improved image quality, structure, and performance parameters.

16 Claims, 11 Drawing Sheets

WEARABLE DISPLAY APPARATUS

CROSS-REFERENCE TO RELATED APPLICATIONS

The present application is a continuation of, and claims priority to, U.S. patent application Ser. No. 14/294,394 (now U.S. Pat. No. 9,052,505) filed on Jun. 3, 2014, which in turn is a continuation of, and claims priority to, PCT/CN2012/085987 filed on Dec. 6, 2012, which claims priority in part to CN 201110404197.1 filed on Dec. 6, 2011. The disclosures of these applications are hereby incorporated by reference in their entirety.

BACKGROUND

Display apparatuses are important parts of human-machine interfaces. Near-eye display apparatuses such as helmet-mounted displays are popular products in the display field. Helmet-mounted image display apparatuses used for virtual reality and display enhancement have gained rapid development. A helmet-mounted display apparatus can comprise three portions: a display image source, an optical system, and a support structure. Because users might wear the helmet-mounted display apparatus for a long time, the weight and compactness are important to the users' comfort.

SUMMARY

In one aspect, the instant disclosure provides a display apparatus, including: a waveguide optical device; a projection optical system including an optical free-form surface; and a microdisplay device; wherein the projection optical system is coupled into the waveguide optical device through an tilted optical path.

In some embodiments, the waveguide device includes a planar waveguide optical element including: a rectangular prism input coupling end; a dichroic mirror array output coupling end; wherein parameters of the waveguide include: a plate thickness d; an angle θ between the dichroic mirror and a plane; a distance h1 between the input coupling end and the output coupling end; a distance h2 between dichroic mirrors of the array; a glass refractive index n; wherein of the waveguide device: the dichroic mirror array has mirrors parallel to each other; the angle θ satisfies 20°≤θ≤40°; the distance h2 between dichroic mirrors satisfies h2=d/tan(θ); the refractive index n satisfies that 1.4≤n≤1.8; the thickness d satisfies that 1.4≤d≤3.6 mm.

In some embodiments, the planar waveguide optical element output coupling end comprises at least two parallel dichroic mirrors.

In some embodiments, the planar waveguide optical element input coupling end comprises a reflector or a triangular prism.

In some embodiments, the projection optical system comprises a light engine system and a free-form surface prism imaging system.

In some embodiments, the projection optical system comprises a prism having at least one optical free-form curved surface.

In some embodiments, the free-form surface prism comprises at least three free-form curved surfaces, of which the thicknesses are less than 5 mm and the widths are less than 10 mm, and the two orthogonal pupil exit positions may not coincide.

In some embodiments, the projection optical system overlaps with the input coupling end substantially, and the long exit pupil overlaps with the exit pupil of the waveguide device substantially.

In some embodiments, the light engine comprises a PBS beam splitter, a ¼ wave plate, a reflector, and an LED light source.

In some embodiments, if the input coupling end of the planar waveguide optical element comprises a reflector, and the input coupling end substantially overlaps with the free-form surface prism exit pupil, the following conditions can be satisfied to reduce stray light:

$$0 \le T_{exd} \le d, \text{ optimally } T_{exd} = d \times \frac{\tan\omega'_y}{\tan\omega_y},$$

$$D_{exd} = 2d \times \frac{\tan\theta_i + \tan\theta_i \tan\omega'_y \tan\theta}{1 + \tan\theta \tan\theta_i}.$$

wherein $\theta_i$ is the incident angle of light beam at the front or back surface of the waveguide optical element, $\omega_y$ is the largest field of view angle in the light pupil expansion direction, $\omega_y'$ is the refractive angle of the largest field of view light beam in the light pupil expansion direction incident on the waveguide optical element.

In another aspect, the present disclosure provides a near-eye display system including a microdisplay apparatus, wherein the microdisplay apparatus comprises: a first and a second microdisplays, configured to display a closer and a farther observation image to the user's eyes, respectively, or display respectively a farther and a closer observation image to the user's eyes, respectively, wherein the first and second observation image have different distances to the user's eyes, but the fields of view areas covered are substantially the same. The first image is weighted toward rendering the objects with nearer depths in the three-dimensional scene, and the second image weighted toward rendering the objects with farther depths in the three-dimensional scene, wherein the projection optical system comprises: a first optical curved surface prism configured to magnify and place an image displayed by the first microdisplay at a distance relatively close to the user eye; a second optical curved surface prism configured to magnify and place an image displayed by the first microdisplay at a distance relatively far from the user eye; the first prism and the second prism include a pair of optical surfaces with same shape parameters but of opposite signs, i.e., the second optical surface of the first prism and the first optical surface of the second prism are glued together seamlessly, wherein the connection is coated with a half-permeable membrane to achieve the integration of two focal plane images.

In some embodiments, the first prism comprises three optical free-form surfaces, wherein: at least one light reflection occurs at one of the optical free-form surfaces, the second optical surface is a concave reflecting surface, a space surrounded by the three optical free-form surfaces is filled with glass or resin optical material with a refractive index greater than 1.4, the optical surfaces may include one of spherical surfaces, aspherical surfaces, or free-form surfaces such as complex curvature XY polynomial surfaces; light coming from the first microdisplay enters the first prism through the third optical surface, gets reflected by the first optical surface and is directed to the second optical surface, and gets reflected by the second optical surface before it enters the users' eyes through the first optical surface.

In some embodiments, the second prism comprises three optical free-form surfaces, wherein: at least one light reflection occurs at one of the optical free-form surfaces, the space surrounded by the three optical free-form surfaces is filled with glass or resin optical material with a refractive index greater than 1.4, the optical surfaces can be spherical surfaces, aspherical surfaces, free-form surfaces, or complex curvature XY polynomial surfaces; light coming from the second microdisplay enters the second prism through the third optical surface, gets reflected by the second optical surface and is directed to the first optical surface, and transmits through the first optical surface and then the first optical free-form surface before it enters the exit pupil of the near-eye display system.

In some embodiments, the first prism comprises three optical free-form surfaces, wherein: at least one light reflection occurs at one of the optical free-form surfaces, a space surrounded by the three optical free-form surfaces is filled with glass or resin optical materials with a refractive index greater than 1.4, the optical surfaces may include one of spherical surfaces, aspherical surfaces, free-form surfaces, or complex curvature XY polynomial surfaces; light coming from the first microdisplay enters the first prism through the third optical surface, gets reflected by the first optical surface and is directed to the second optical surface, gets reflected by the second optical surface and then transmits through the first optical surface before it enters the users' eyes.

In some embodiments, the second prism comprises three optical free-form surfaces, wherein: at least one light reflection occurs at one of the optical free-form surfaces, the space surrounded by the three optical free-form surfaces is filled with glass or resin optical material with a refractive index greater than 1.4, the optical surfaces can be spherical surfaces, aspherical surfaces, free-form surfaces, or complex curvature XY polynomial surfaces; the light coming from the second microdisplay enters the second prism through the third optical surface, gets reflected by the first optical surface and is directed to the second optical surface, gets further reflected to the first optical surface for transmission, and transmits through the second and then the first optical surfaces of the first prism before it enters the exit pupil of the near-eye display system.

In some embodiments, the first prism comprises three optical free-form surfaces, wherein: at least one light reflection occurs at one of the optical free-form surfaces, the space surrounded by the three optical free-form surfaces is filled with glass or resin optical material with a refractive index greater than 1.4, the optical surfaces can be spherical surfaces, aspherical surfaces, free-form surfaces, or complex curvature XY polynomial surfaces; the light coming from the first microdisplay enters the first prism through the third optical surface, gets reflected by the second optical surface and is directed to the first optical surface, gets reflected to the first optical surface by the second optical surface, and transmits through the first optical surface before it enters the exit pupil of the near-eye display system.

In some embodiments, the second prism comprises three optical free-form surfaces, wherein: at least one light reflection occurs at one of the optical free-form surfaces, the space surrounded by the three optical free-form surfaces is filled with glass or resin optical material with a refractive index greater than 1.4, and the optical surfaces can be one or a plurality of spherical surfaces, aspherical surfaces, or free-form surfaces; the light coming from the second microdisplay enters the second prism through the third optical surface, gets reflected by the first optical surface and is directed to the second optical surface, gets further reflected to the first optical surface for transmission, and transmits through the second and then the first optical surfaces of the first prism before it enters the exit pupil of the near-eye display system.

In some embodiments, the first prism comprises three optical free-form surfaces, wherein: at least one light reflection occurs at one of the optical free-form surfaces, the space surrounded by the three optical free-form surfaces is filled with glass or resin optical material with a refractive index greater than 1.4, and the optical surfaces can be one or a plurality of spherical surfaces, aspherical surfaces, or free-form surfaces; the light coming from the first microdisplay enters the first prism through the third optical surface, gets reflected by the second optical surface to the first optical surface, and transmits through the first optical surface before it enters the exit pupil of the near-eye display system.

In some embodiments, the second prism comprises three optical free-form surfaces, wherein: at least one light reflection occurs at one of the optical free-form surfaces, the space surrounded by the three optical free-form surfaces is filled with glass or resin optical material with a refractive index greater than 1.4, and the optical surfaces can be one or a plurality of spherical surfaces, aspherical surfaces, or free-form surfaces; the light coming from the second microdisplay enters the second prism through the third optical surface, gets reflected by the second optical surface to the first optical surface, and transmits through the second and then the first optical surfaces of the first prism before it enters the exit pupil of the near-eye display system.

In some embodiments, the tilted light path is a non-rectangular light path.

In another aspect, the present disclosure provides a near-eye display method, comprising the coupling of a projection optical system with a free-form optical surface to a waveguide optical element to form a waveguide optical device, using tilted optical path. The size of the display apparatus is much smaller because the two directions of the free-form curved surfaces' exit pupil do not overlap. Meanwhile, the use of the optical waveguide element makes the optical element located in front of the users' eyes to be very thin.

Various features will be described in details in the following different example embodiments, and will become apparent.

DETAILED DESCRIPTION

Figure 1:
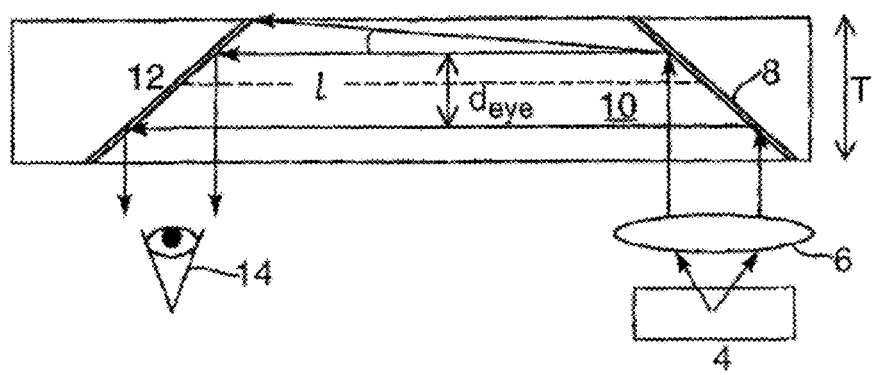
FIG. 1 is a structural diagram of a conventional planar waveguide display system.

The following description, with reference to the accompanying drawings, describes some embodiments of the display devices, systems, and methods. Similar reference numerals are used to denote similar parts when applicable.

It can be difficult for conventional spherical optical technologies to achieve optical see-through functionalities. Even if the see-through functionality is achieved, the systems can also get bulky in size, have small fields of views, and have low resolutions, etc. The field of view is limited by the lens thickness. In general, the larger the field of view, the greater the thickness of the optical system is.

One embodiment disclosed herein uses a free-form surface optical technology to realize diffraction-reflection and off-axis structure design for a light weighted helmet-mounted optical see-through display system with a large field of view. The thickness of the part located in front of the eyes can still be limited by the structure, and is normally greater than 1 cm. Another embodiment uses a waveguide technology, allowing the thickness of the optical element located in front of the eyes to be reduced to a few millimeters, and thus realizes the optical see-through functionality. The optical waveguide component does not generate optical power, and the virtual imaging portion has low optical energy utilization and may need projection magnification by a projection optical system, so the two portions need to be coupled appropriately. When the conventional waveguide element is used for the helmet mounted display system, a light engine may be needed to generate highly bright display images. The projection system and the light engine can be bulky and heavy, thereby affecting the volume and weight of the helmet display system. In addition, the conventional waveguide element used for helmet display system can have problems such as a small field of view, and stray light interferences.

For example, the input coupling end of the conventional waveguide optical element may use a tilted reflector, and it causes a fairly amount of stray light between the reflector and interface of the waveguide's front and back surfaces. To reduce the stray lights, the projection optical system's exit pupil needs to be coupled with the entrance pupil without fully using the coupling reflector. Therefore, alignment precision and exit pupil diameter of the projection optical system are highly demanded in the conventional waveguide elements. In addition, the conventional coupling method also limits the volume miniaturization of the overall size of the display system. Because the projection system is located behind or in front of the waveguide, reflectors are needed for folding.

FIG. 1 is a schematic structural view of a conventional planar waveguide display system. A waveguide element comprises a plane reflector input-coupling end and a plane reflector output coupling end. Light coming from the micro display 4, gets collimated by the projection optical system 6, transmits through the front surface of the waveguide plate, propagates in the waveguide after being coupled by the reflector 8 of the input coupling end and reaches the output-coupling end 12. The light leaves the front surface and reaches the users' eyes 14 after being reflected by the output coupling end. This can be considered a prototype waveguide helmet mounted display system. However, because there is only one reflector at the output-coupling end, and the light is reflected directly to the output coupling end from the input-coupling end, the field of view of the waveguide optics element and the thickness are greatly restricted. The thickness T of the waveguide components increases substantially with an increasing field of view.

Although this structure is simple, it may have multiple disadvantages, among which the main one is the largest field of view is severely restricted by the glass plane thickness. As can be seen from the drawing, the slab waveguide has a maximum allowable angle of:

$$\alpha_{max} = \arctan\left(\frac{T - d_{eye}}{2l}\right),$$

wherein T is the thickness of the slab waveguide, $d_{eye}$ is the exit pupil diameter of the waveguide optical system, and l is the distance between the two reflective surfaces. If the angle is greater than $\alpha_{max}$, the light will be reflected at the front and back surfaces of the waveguide slab before it reaches the second reflective surface, and ghost images may be formed by the stray light caused from multiple light reflections. Therefore, the maximum angle of field of view of this type of structure can be obtained as follows:

$$FOV_{max} \approx 2\nu\alpha_{max},$$

wherein $\nu$ is the refractive index of the planar glass, typically between 1.5-1.6. Because the human eye pupils' diameters are in the range of 2-6 mm, in order to adjust to the eye movements, the minimum acceptable value of the planar waveguide system exit pupil diameter is about 8 mm. For most people, l is between 40-60 mm. Therefore, even if the field of viewing angle is only 8°, the system may need a thickness of the glass plane to be up to 12 mm.

Figure 2:
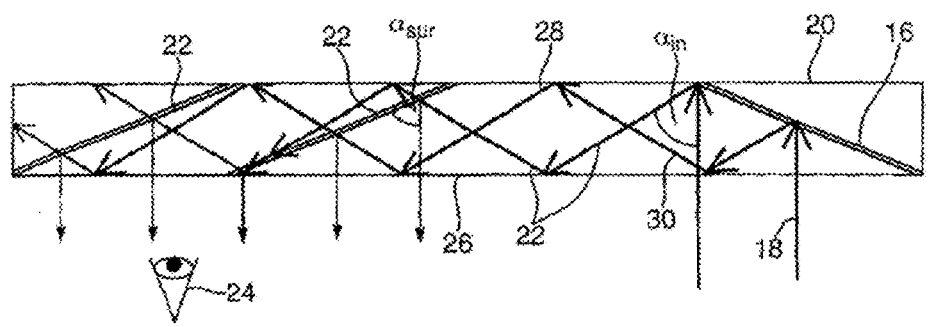
FIG. 2 is a diagram of internal optical paths of a conventional planar waveguide display system.

FIG. 2 is a schematic diagram illustrating internal optical paths of a conventional planar waveguide display system. To overcome the restrictions on the field of view due to the single-reflective-surface-coupling output in the geometric planar waveguide system, multiple-reflective-surface-coupling output geometry of the waveguide is used, shown in FIG. 2. In this configuration, the output coupling portion utilizes a series combination of half-transmission-half-reflection lenses to solve the limitation of the field of view along the light propagation direction.

The input-coupling reflective surface is illuminated by light emitted from the image source after being collimated. The reflective surface couples the incident light to the waveguide to ensure the light is confined within the waveguide, and internal reflections occur inside the glass plane. After multiple reflections, the light reaches the transflective surface used for output coupling. On the transflective surface, part of the light leaves the waveguide and enters the users' eyes, and the other part of the light transmits through the surface and continues to propagate to the next transflective lens. The maximum field angle allowed in this structure is:

$$FOV_{max} \approx \frac{NT\tan\alpha_{sur} - d_{eye}}{R_{eye}}.$$

It is known from the formula of the field of the output coupling set comprising a series of transflective lenses can overcome the limit on the maximum field of view allowed, which is rather small. The field of view angle can be infinitely expanded as long as there is enough number of transflective lenses. However, considering that as the number of transflective lenses increases, the energy carried by the light decreases rapidly after passing through these lenses, it is reasonable to use 4-6 such lenses. When N equals 4, the coupling surface inclination angle is 30°, the required thickness of the glass plane for the field of view angle of 15° and 30° is merely 5.3 mm and 8.2 mm, respectively. Compared to the conventional structure of the single reflective output coupling, the thickness of the glass plane is greatly reduced.

Considering the field of view in X-direction of the waveguide, the maximum field of view in X-direction is not related to the size and number of the transflective lenses, but is dependent on the range of the light beam perpendicular to the waveguide. The maximum field of view is $$FOV_{max} \approx \frac{D_\eta - d_{eye}}{R_{eye} + l/(v\sin\alpha_{in})},$$

wherein v is the refractive index of the waveguide, typically between 1.5 and 1.6, l is the distance between the input coupling central axis and output coupling central axis, about 40-60 mm, $d_\eta$ is the range of the input light beam in the direction perpendicular to the waveguide.

If the field of view required in the X direction is 30°, with the parameters given above, the width of the light beam width in the X direction will be approximately 42 mm. The width in the horizontal direction is given by the formula $S_Z = T \tan(\alpha_{in})$. Therefore, the width of the light beam width in the horizontal direction is about approximately $S_Z = 6.8$ mm, which indicates the aspect ratio of the incident light beam to be 6. This may require the numerical aperture of the collimating optical system to be very large, making it difficult to make a compact and portable system.

Figure 3:
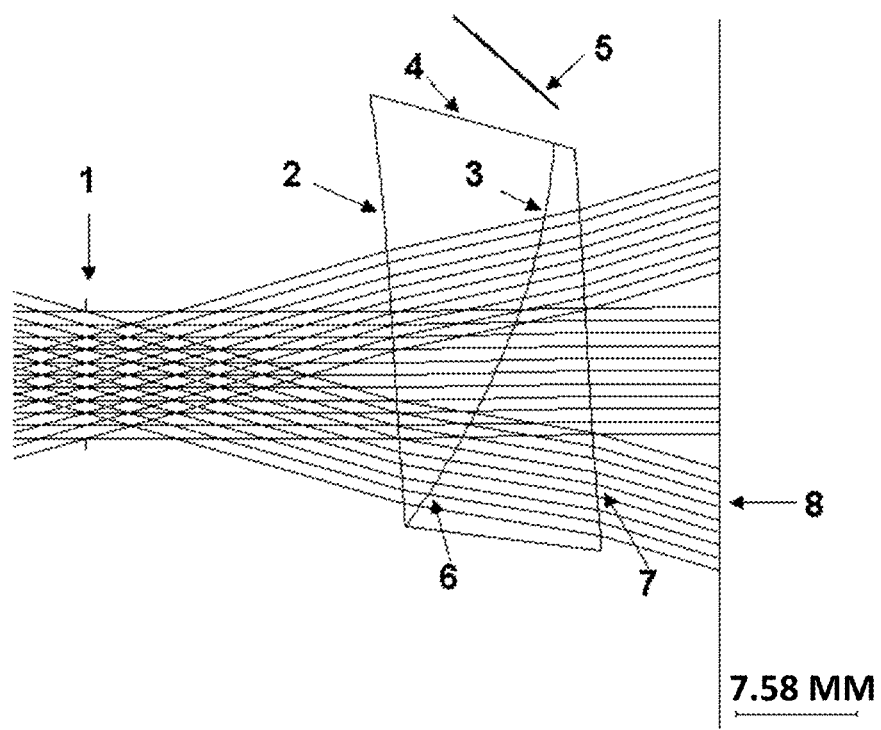
FIG. 3 is a structure diagram of a free-form surface projection optical system.

FIG. 3 is a structural diagram of a free-form curved surface projection optical system. It can be used in augmented reality transmission-type imaging optical system. In FIG. 3, light coming from microdisplay 5 transmits through optical surface 4 of the free-form curved surface prism, has a total reflection on optical surface 2 and reaches towards the concave reflective surface 3. After the reflection off the reflective surface 3, the light enters the user's eyes through optical surface 2. In augmented reality transmissive helmet, the optical structure of the internal channel does not change Optical surface 3 uses a transflective structure. The energy of the external light loses ½ of its energy when it is incident on the optical surface 3, and a portion transmits through optical surface 3 and optical surface 2 to enter the user's pupil.

Figure 4:
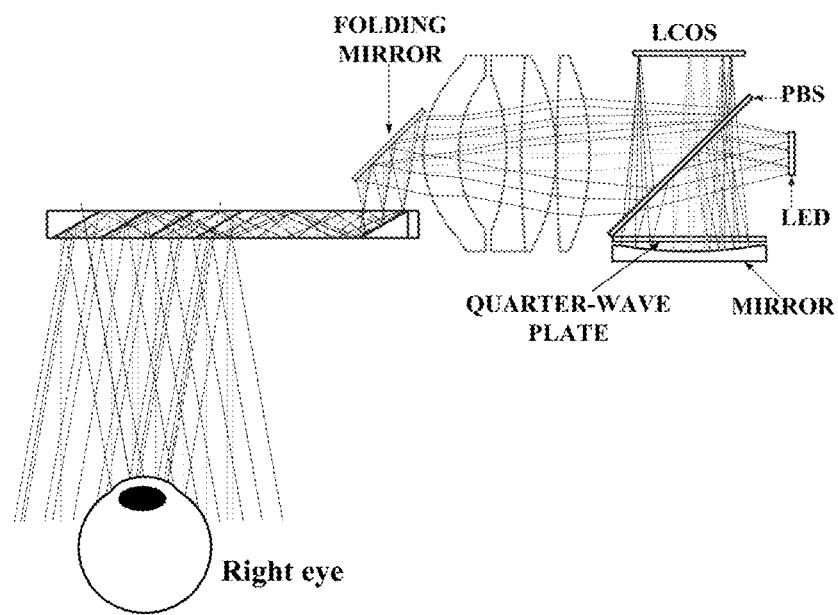
FIG. 4 is a diagram of a planar waveguide display system according to some embodiments.

FIG. 4 is a diagram of a planar waveguide display system according to some embodiments; it comprises waveguide optical elements and a projection optical system. The projection optical system further includes an illumination light engine system. The conventional projection system may use a spherical lens or a conventional aspherical lens. A bulky projection system can cause difficulties in reducing the weight and volume of the waveguide helmet system.

Figure 5:
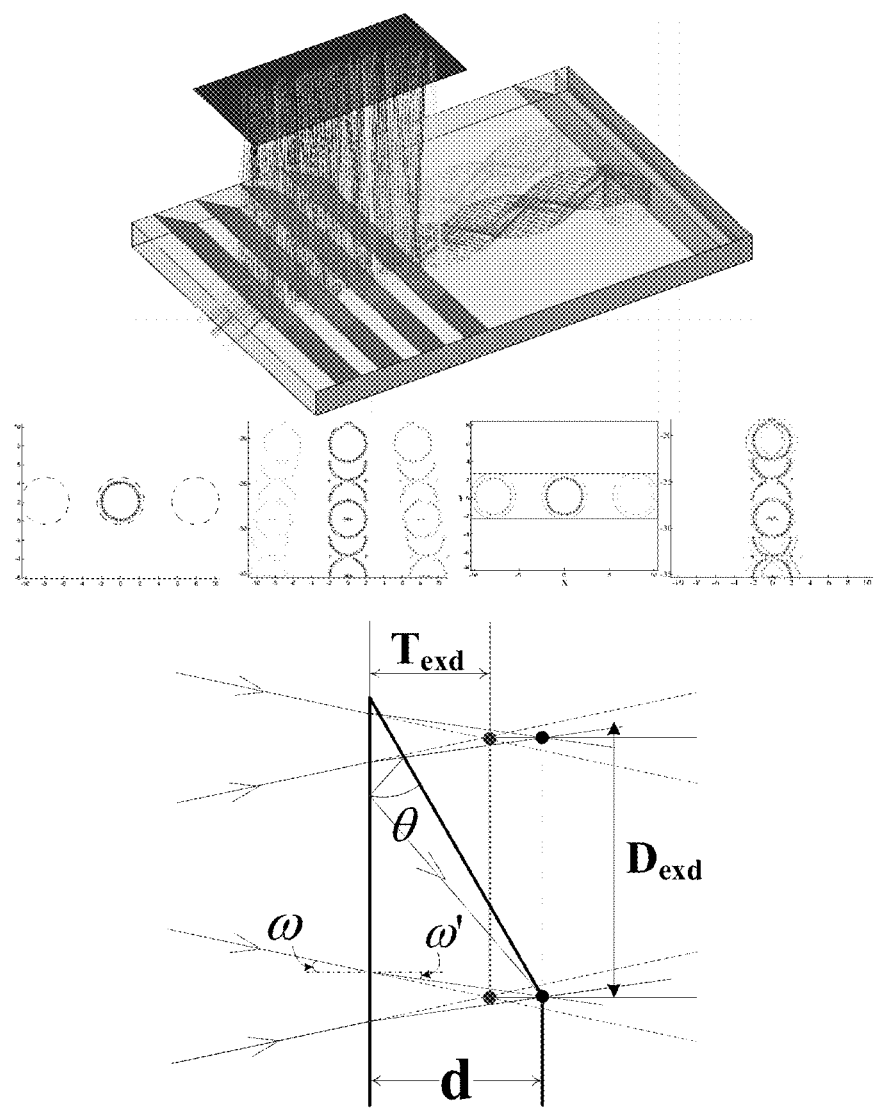
FIG. 5 is an illustration of the relative relationship between the entrance pupil and the exit pupil of a projection system.

FIG. 5 is a schematic diagram illustrating the relative relationship between the exit pupil and the entrance pupil of the projection system; if the exit pupils of the projection system in two directions are the same and they located in the input coupling end of the waveguide optical element, at the exit pupil position of the system, light beams of different fields of views in the direction perpendicular to the exit pupil expansion direction may separate, making it impossible for the user's eyes to see the full image simultaneously. If the exit pupil in the direction perpendicular to the exit pupil expansion direction is located in the entrance pupil position of the optical waveguide element, the position of the exit pupil of the system can form a superimposed and expanded exit pupil.

The exit pupil of the projection optical system may need to be matched to the entrance pupil of the optical waveguide element appropriately, so as to effectively eliminate unnecessary stray light. So in order to reduce stray light generated by the waveguide optical element entrance coupling end, the exit pupil of the projection optical system may need to be matched to the entrance pupil of the optical waveguide element appropriately.

Figure 6:
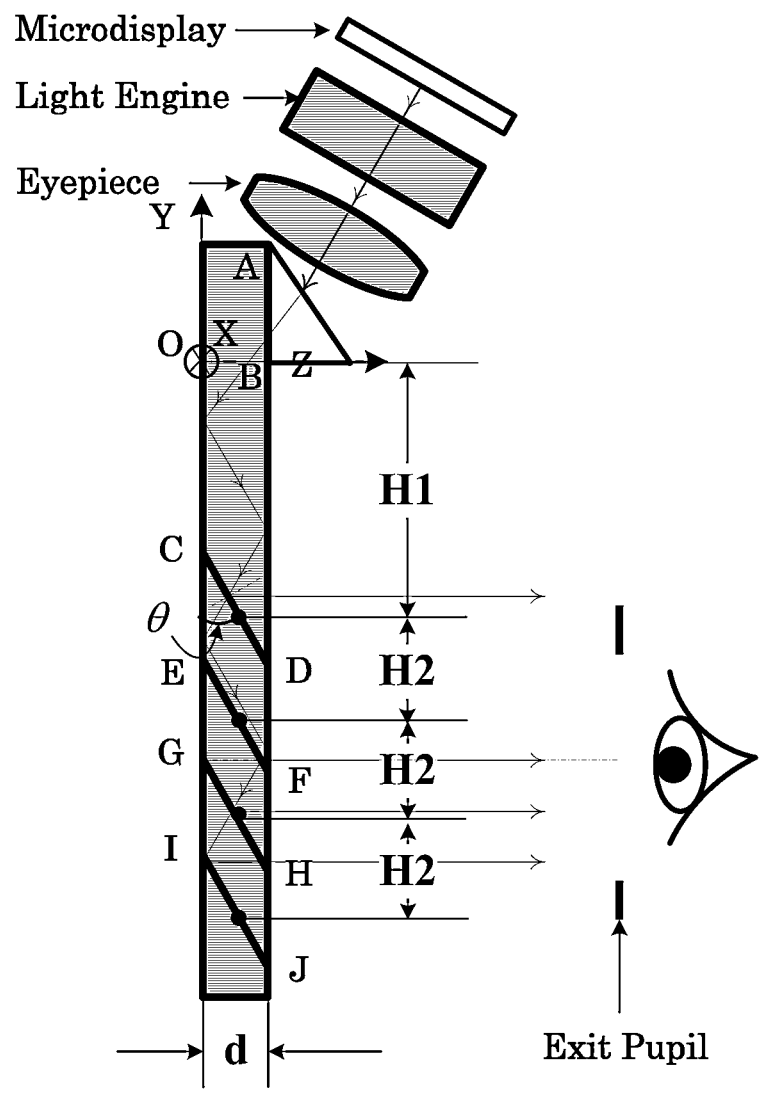
FIG. 6 is a schematic of optical paths inside the waveguide according to some embodiments.

FIG. 6 is a schematic diagram of the optical path inside the waveguide according to some embodiments; the entrance pupil of the waveguide optical element may comprise a triangular prism, and an optical surface of which coincides with the surface of the waveguide optical element. Light can transmit through the prism slanted surface directly and is coupled into the waveguide optical element without reflection, reducing possible stray light generated at the input coupling end of the conventional waveguide optical element. Meanwhile, the projection system can be realized using a free-form optical system.

Figure 7:
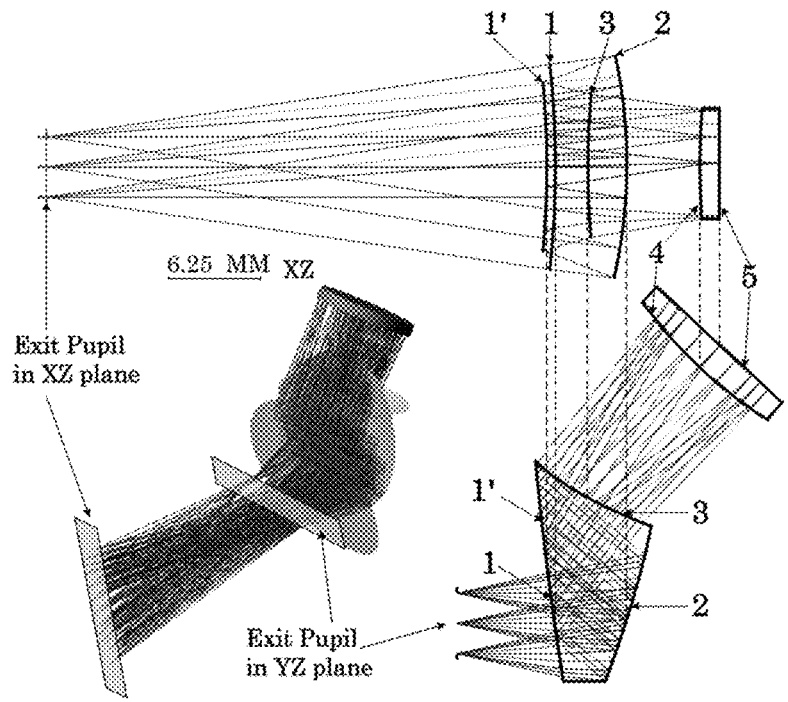
FIG. 7 is a top view of the light propagation inside the waveguide.
Figure 7:
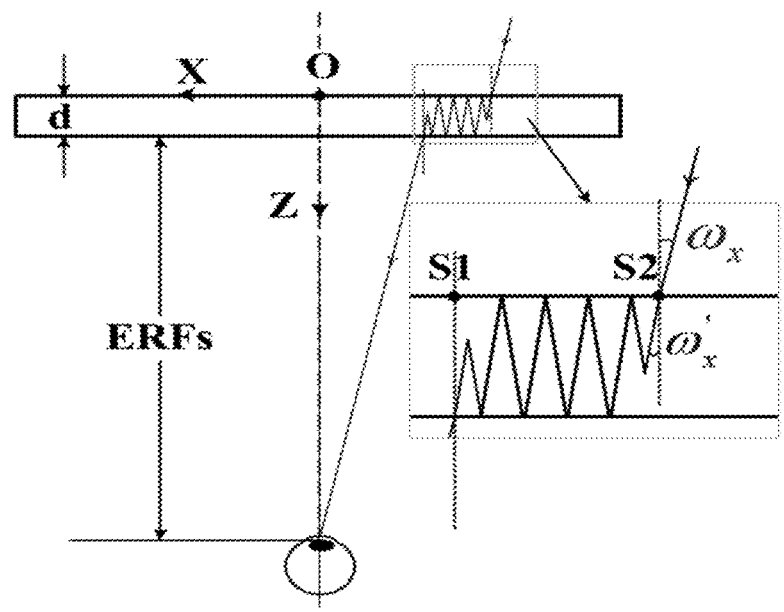

FIG. 7 is a diagram of light propagation inside the projection optical system; it includes a three-dimensional view, a top view (XZ), and a side view (YZ). As can be seen from the drawing, the exit pupil positions at the two directions of the free-form curved surface projection system do not overlap, and the exit pupil distance in the XZ plane is greater than the projection distance within the YZ plane.

Figure 8:
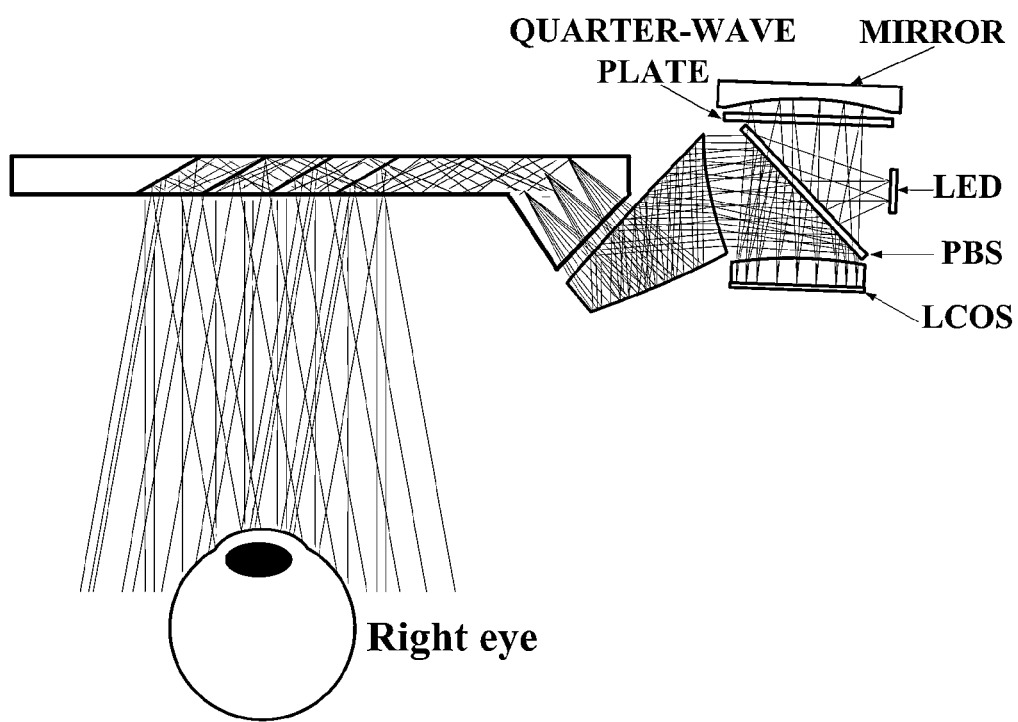
FIG. 8 is a structural diagram of the free-form surface optical waveguide in a helmet implementation.

FIG. 8 is a schematic diagram of the optical path structure of the free-form curved surface waveguide helmet according to some embodiments; it uses the waveguide optical element illustrated in FIG. 6 and the free-form curved surface projection optical system illustrated in FIG. 7. As a result of using the free-form curved surface, the simplification of the projection optical system can be maximized, allowing the bulky projection system to be miniaturized with reduced weight and volume, thereby reduces weight and volume of the entire system.

Figure 9:
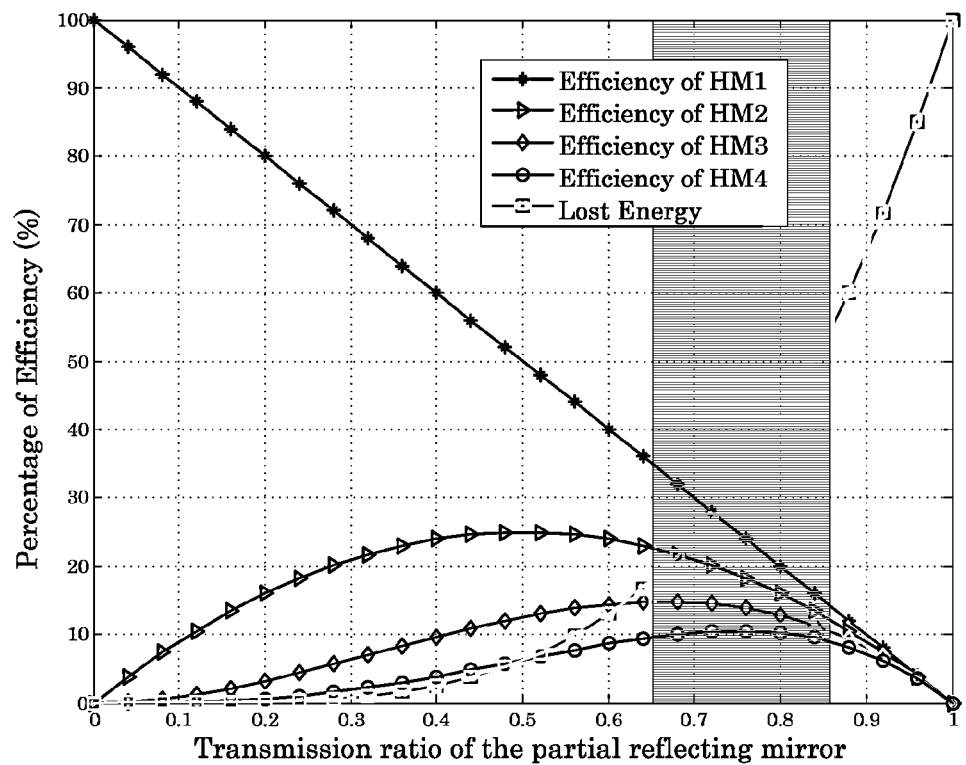
FIG. 9 is an illustration of the relationships between light output efficiency and reflectivity of each of the half-mirrors.

FIG. 9 illustrates the relationship between the light output efficiency and the reflectivity of each transflective lens. In order to ensure the consistency of real transmittance of light through the waveguide system, and to simplify the processing and coating of each beam splitter, various beam splitter surfaces can be coated with the same film. Each curve shown in the drawing illustrates the light beam curve of the output coupling efficiency of the reflector as a function of the transmittance at different positions. As such, the reflectivity of each beam splitter coating cannot be too high, otherwise the output coupling light efficiency of the beam splitter located at the waveguide entrance output coupling end will have an overly low efficiency, which results in large differences in the overall image brightness and affects the overall wholeness and viewing effect of the image. The light output coupling efficiency formula can be expressed as:

$$E_{ri} = T_r^{i-1} \times (1 - T_r),$$

where T is the transmittance of the beam splitter, and i represents the i-th beam splitter.

As shown in FIG. 9, in the case that each beam splitter has the same reflectivity, the output coupling efficiency of the light energy of each reflector varies with a changing transmission. When the transmittance is 1, the light energy output coupling efficiency is 0. As can be seen from the figure, the transmission of each beam splitter control may be preferably controlled to be between 0.65 and 0.85.

Some embodiments disclosed herein provide a free-form curved surface prism helmet display, realizes a large field of view, reduces or eliminates stray lights, and has relatively high light energy utilization efficiency.

Some embodiments disclosed herein use a new coupling method, to further fold the system, thereby realizes a more compact display system. Using tilted optical paths, the system thickness is greatly reduced. Optical gratings can also be used as the coupling component besides the prism mentioned above.

Compared with conventional helmet display technology, some embodiments disclosed herein use free-form curved surface technology and waveguide technology to fully promote and utilize their advantages, and thereby reduce the volume and weight of the helmet display system.

Some embodiments provide a waveguide near-eye display apparatus that is particularly suitable for outdoor and mobile augmented reality display systems. Development of helmet display optical system has evolved from a coaxial rotationally-symmetric transmission-type structure into a catadioptric structure. In order to achieve the see-though function, light weight, and a glasses-type display effect, the helmet display technologies use an off-axis catadioptric structure, free-form curved surfaces, holographic diffraction, and waveguide technologies. Existing helmet displays have disadvantages such as small field of view, large size, and heavy weight. The embodiments described below use free-form curved surface optics in conjunction with waveguide technologies, to overcome the disadvantages of traditional helmet displays, reduces the size and weight of near-eye helmet displays, increases the field of view, and reduces stray light.

In some of the following embodiments, the coordinate system may be specified as a right-handed coordinate system, for example: the direction horizontally to the right is the Z-axis direction, the direction upward perpendicular to the Z-axis direction is the Y-axis, and the direction inward perpendicular to the paper plane YOZ is the X-axis. The light comes from the light source, goes through the light engine, the free-form surface projection system, the planar waveguide, and reaches the user's eyes.

In the following, with reference to the attached drawings, embodiment of the free-form surface prisms helmet display optical system is provided. Imaging optical path of the microdisplay 5 and the imaging quality of the optical imaging system are described in detail. The optical path may include an internal channel, and an external channel to observe the outside world.

As shown in FIG. 8, the free-form surface projection optical system can include a free-form surface prism and an illumination light engine. The light engine may include a light source, a polarization beam splitter (PBS), a reflector, and a ¼ slide. It can achieve high energy utilization efficiency and uniform illumination over the image source. The free-form surface prism can comprise one of a plurality of free-form curved surfaces, such as a few free-form curved surfaces or non-spherical surfaces, using catadioptric projection optical path mode to enable system miniaturization.

As shown in FIG. 8, the planar waveguide optical element can comprise a series of semi-reflective/semi-transparent prisms, including an input-coupling portion and an output-coupling portion. The input-coupling portion can include a rectangular prism and a plate, and the output coupling portion can include an array of semi-reflective/semi-transparent lenses bonded together.

The projection optical system can include a free-form surface prism, an illumination light engine, and a microdisplay. The illumination light engine can project the light uniformly onto the image source after collimating the light source. The illuminated images can be further collimated and magnified by the free-form surface prism optical element, forming an output pupil in the two perpendicular directions of the exit end of the free-form surface prism. The nearer exit pupil overlaps with the input coupling end of the planar waveguide optical element substantially and the farther exit pupil overlaps with the exit pupil of the planar waveguide optical element substantially. The parallel light beam, after collimated by the projection optical system, can be incident on the input prism according to a specified method, and then coupled into the waveguide. The light beam's incidence angle at the front and back surfaces of the planar waveguide are greater than the respective critical angles. After transmitting in the waveguide through multiple total reflections between the front and back surfaces, the light beam can then propagate through the output-coupling end of the planar waveguide as the output, couples into the air, and eventually reaches the user's eyes.

According to some embodiments, interactions between the waveguide and the free-form surface can reduce the pupil diameter. For example, the diameters can be reduced from 6-8 mm down to 3-4 mm; the sagittal direction of the free-form curved surface can be extended; the free-form surface prism exit pupil distance can also reduced. In particular, the improvements on the overall system from the free-form curved surfaces may include: a more compact size, lighter weight, less stray light, such as little or no stray light at the input-coupling end.

Referring to FIG. 8: the light coming from the LED light source gets reflected by a beam splitter PBS, goes through a ¼ slide, undergoes a polarization state rotation by 45 degrees, gets reflected by a reflector and goes through the ¼ slide again, undergoes a polarization state rotation by 45 degrees again, changes from p light to s light, and is incident on the beam splitter PBS. The light goes through the beam splitter PBS and reaches the LCOS display chip. After illuminating the LCOS, the light is reflected to the PBS beam splitter. The LCOS changes the polarization state of the light by 90 degrees. At this point the light is reflected by the PBS and it enters the free-form surface prism projection system. The free-form surface prism projection system collimates and magnifies the light beam, which is coupled into the waveguide optical element through the exit pupil. The light further propagates in the waveguide, and eventually reaches the user's eyes through the output-coupling portion.

Table A lists 10 groups of preferred parameters of the waveguide structure, wherein Theta is the angle between the half-transmission-half-reflection lens and the waveguide plane, d is the thickness of the optical waveguide element, H1 is the distance between the input-coupling end and the output-coupling end, index is the material refractive index of the optical waveguide. PV lists PV values of the ratio between the stray light and the useful light, AVE is the average value, RMS is the root mean square value, EPDY is the exit pupil diameter of the system in the Y direction. The above parameters are for the case where the exit pupil distance is 20 mm.

TABLE A

| No. | Theta | d | H1 | Index | PV | AVE | RMS | EPDY |
|---|---|---|---|---|---|---|---|---|
| 1 | 29.6 | 3.2 | 17 | 1.78 | 0.04655 | 0.02613 | 0.02962 | 13.34 |
| 2 | 29.6 | 3.0 | 16 | 1.78 | 0.04750 | 0.02622 | 0.02974 | 11.96 |
| 3 | 29.6 | 2.8 | 15 | 1.78 | 0.04836 | 0.02631 | 0.02988 | 10.67 |
| 4 | 29.6 | 2.6 | 14 | 1.74 | 0.04852 | 0.02682 | 0.03045 | 9.24 |
| 5 | 29.6 | 2.6 | 14 | 1.78 | 0.04900 | 0.02639 | 0.03030 | 9.29 |
| 6 | 29.6 | 2.8 | 15 | 1.74 | 0.04952 | 0.02675 | 0.03034 | 10.56 |
| 7 | 29.6 | 2.4 | 13 | 1.78 | 0.04995 | 0.02646 | 0.03010 | 7.98 |

TABLE A-continued

| No. | Theta | d | H1 | Index | PV | AVE | RMS | EPDY |
|---|---|---|---|---|---|---|---|---|
| 8 | 29.6 | 2.4 | 13 | 1.74 | 0.05017 | 0.02694 | 0.03063 | 7.88 |
| 9 | 29.6 | 2.4 | 13 | 1.70 | 0.05108 | 0.02741 | 0.03113 | 7.85 |
| 10 | 29.6 | 3.0 | 16 | 1.74 | 0.05130 | 0.02674 | 0.03033 | 11.93 |

The following embodiments do not include the waveguide portion so as to mainly describe the advantages brought by the free-form surfaces.

Some embodiments disclosed herein provide a realistic three-dimensional bifocal monocular helmet display device, comprising a first optical curved surface prism and a second optical curved surface prism. The optical surface may be in the form of a spherical, an aspheric or a free-form surface. Each prism may comprise a first optical surface, a second optical surface, and a third optical surface. The first optical curved surface prism and the second optical curved prism include a pair of curved surfaces with the same surface shape. The curved surface on the first optical surface is coated with a half-transmissive-half-reflective membrane, and the first and second optical curved surface prisms can be boned together; together there are display components, including the first and second microdisplays. The first optical curved surface prism and the first microdisplay form the first display focal plane, and the second optical curved surface prism and the second microdisplay form the second display focal plane. The first and second display focal planes each generates a viewing screen closer and farther from the user's eyes, respectively, or each generates a viewing screen closer and farther from the user's eyes, respectively. When rendering images, according to the depths of objects in the scene, depth filters may be applied respectively to the two microdisplays, thereby generate the observed images with realistic three-dimensional views. The bifocal monocular helmet display device according to some embodiments of the disclosure is compact, and light weighted. In particular, for stereoscopic helmet display device, the embodiments provide helmet mount display devices that are in line with the human eye's natural stereoscopic vision. It solves or improves the problems in traditional stereoscopic helmet display devices where the focus and vergence are not consistent, and it improves comfort level as well as relieves visual fatigue.

Embodiments of the present disclosure provide a free-form curved surface prism helmet mount display device optical system, in particular, an optical system that can, with a monocular design, generate a real stereoscopic effect with a compact bifocal helmet mount display.

Factors contributing to the three-dimensional vision of the human eyes include: the size of the object, the clarity of the object, and the binocular parallax for the object. Typically the human eyes' focus and vergence correlation provides information for a sense of depth. However, the focus and vergence information provided by the traditional binocular helmet mount display device may not be consistent. Because light may come from a single focal plane, and for human eyes to see the object clearly, they need to focus on a fixed focal plane. A stereoscopic image is usually of a certain depth, i.e., located in front of and behind the focal plane. The stronger the sensation of being stereoscopic, the larger the differences between the focus and the vergence are. This has led to the inconsistency in the human eyes between focus and vergence, and more likely caused eye fatigue of the user.

Figure 10:
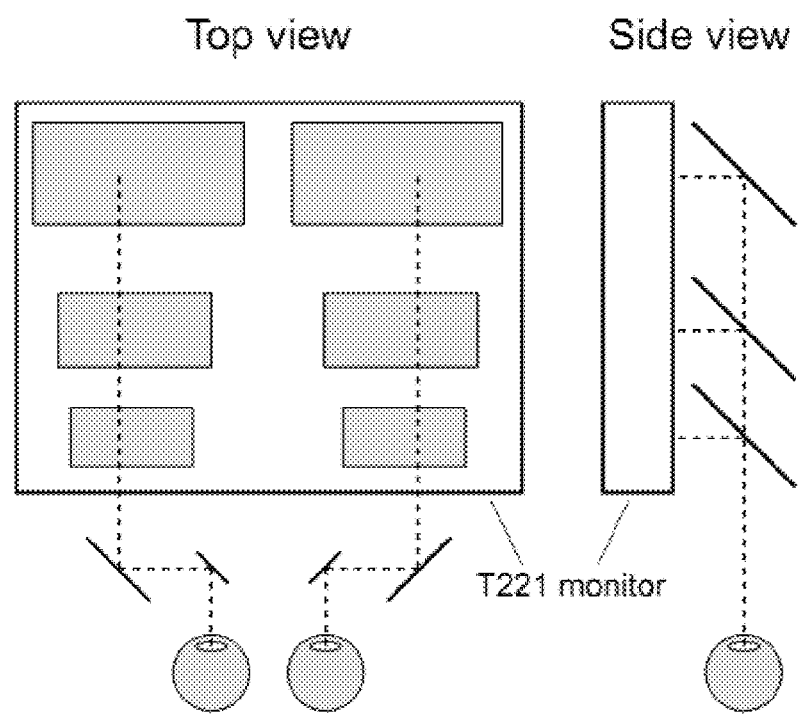
FIG. 10 is an illustration of the focal plane division of optical systems in existing technologies.

To reduce the contradiction caused by the inconsistency between the focus and the vergence at the user's eyes, some solutions such as focal-plane-zoomable HMDs and multi-focal-plane HMDs are studied. The main approaches of focal-plane-zoomable HMDs can be summarized in two categories: changing the image plane position, and changing the position of the optical system. The multi-focal-plane HMD solutions can include time-division multiplexing or spatial multiplexing display solutions. Spatial multiplexing can be achieved by placing stacked microdisplays in front of the visual optical element, and displaying images of different depths in different microdisplays to generate depth information. However, due to the fact that the image from the back travels through a number of microdisplays, the brightness of the image cannot be guaranteed. The integration of multiple light paths can be achieved by using multi-optical beam splitters. The system comprises a plurality of focal planes, and the focal depth information generated from different focal planes can be different. However, such systems are bulky, not easy to be light weighted, and also difficult to be head mounted, as shown in FIG. 10. Time-division multiplexing multiple-focal-plane HMDs use liquid lenses, deformable mirror or lenses, or birefringence lenses to adjust the system's focus, thereby change the distances observed by the system at different times. Such systems may have high requirements on refresh rate of the microdisplays and critical optical components. If more focal planes are constructed, the minimum refresh rate of the system may have even higher requirements.

Some embodiments disclosed herein use spatial multiplexing multi-focal-plane technologies and free curved surface optical technologies to realize compact and light weighted bi-focal-plane HMD. Users can observe three-dimensional images using only a monocular visual optical system, and it is consistent with the natural human eye vision. Light weighted freeform surface bifocal monocular HMD optical system is also suitable for wearing on user's head, and three-dimensional display is produced in line with the natural visual characteristics of the human eye, thereby helps avoiding visual fatigues caused by traditional three-dimensional HMDs.

One embodiment of the optical system uses a reverse optical path design, i.e., tracing light from the eyes to the microdisplay. For the convenience of description, ray tracing direction starts from the position of the exit pupil, through the optical system, and eventually reaches the microdisplay.

Some of the embodiments use spherical and aspheric surface shapes to describe curved surfaces, which can be described by a toric XY polynomial (AXYP) surface. In the surface type column of the following table, sph represents spherical surface, asp represents aspherical surface, and the default is AXYP surface.

In some embodiments, the aspherical surface can be expressed as the equation:

$$z = \frac{cx^2}{1 + [1 - (1+k)c^2x^2]^{1/2}} + Ax^4 + Bx^6 + Cx^8 + Dx^{10}$$

Wherein, c is an apex radius of curvature of the surface, k is the coefficient of the secondary surface, and A, B, C, D are aspherical 4th, 6th, 8th, 10th aspheric coefficients, respectively.

Some embodiments use an Anamorphic Aspherical Surface (AAS). An AAS may also be referred as a complex aspherical surface, which has a radius of curvature in two directions, but can be different. The curved surface is a plane of symmetry, which has two planes of symmetry, each on yoz and xoz planes of symmetry. The advantages include easy control of optimization and fast optimization convergence rate. The AAS can be described as:

$$z = \frac{C_x x^2 + C_y y^2}{1 + \{1 - (1+K_x)C_x^2 x^2 - (1+K_y)C_y^2 y^2\}^{1/2}} + \sum_{i=1}^{n} A_i \{(1-P_i)x^2 + (1-P_i)y^2\}^{i+1} \quad (3)$$

wherein, $C_x$ is the radius of curvature of the curved surface of X direction in the XZ plane, $C_y$ is the radius of curvature of the curved surface of Y direction in the YZ plane, $K_x$ is the conic coefficient of the curved surface in X direction, $K_y$ is the conic coefficient of surface in Y direction, $A_i$ is 4, 6, 8, 10, . . . 2n-order aspheric coefficients, and is rotational symmetric on the Z-axis, $P_i$ is 4, 6, 8, 10, . . . 2n-order non-rotationally symmetric coefficients.

Some embodiments use XY polynomial surface (XYP). XYP surface equation can be described as:

$$\begin{aligned}z(x,y) = & c_1 + c_2 y + c_3 x + c_4 y^2 + c_5 yx + c_6 x^2 + c_7 y^3 + c_8 y^2 x + c_9 yx^2 + \\ & c_{10} x^3 + c_{11} y^4 + c_{12} y^3 x + c_{13} y^2 x^2 + c_{14} yx^3 + c_{15} x^4 + c_{16} y^5 + \\ & c_{17} y^4 x + c_{18} y^3 x^2 + c_{19} y^2 x^3 + c_{20} yx^4 + c_{21} x^5 + c_{22} y^6 + c_{23} y^5 x + \\ & c_{24} y^4 x^2 + c_{25} y^3 x^3 + c_{26} y^2 x^4 + c_{27} yx^5 + c_{28} x^6 + c_{29} y^7 + c_{30} y^6 x + \\ & c_{31} y^5 x^2 + c_{32} y^4 x^3 + c_{33} y^3 x^4 + c_{34} y^2 x^5 + c_{35} yx^6 + c_{36} x^7 + \dots\end{aligned} \quad (4)$$

By appropriately selecting the power of XYP, the surface can be made symmetric on the yoz plane, or symmetric on the xoz plane. The surface shape can provide more freedom, but the ray tracing and optimization may be slower. In one embodiment, this type of surface can be controlled to be a curved surface with only one plane of symmetry.

Some embodiments use an AXYP curved surface equation:

$$z = \frac{c_x x^2 + c_y y^2}{1 + (1-(1+k_x)c_x^2 x^2 - (1+k_y)c_y^2 y^2)^{1/2}} + \sum_{m=0}^{P}\sum_{n=0}^{P} C_{(m,n)} x^m y^n \quad 1 \le m+n \le p$$

wherein, $c_x$, $c_y$ respectively are the radii of curvature of the vertex of the surface in the meridional direction and the sagittal direction, $k_x$, $k_y$ are the conic constants of the surface of the meridional and sagittal directions, respectively, $C_{(m,n)}$ is the coefficient of the polynomial $x^m y^n$, and p is the highest number of power of the polynomial.

Figure 11:
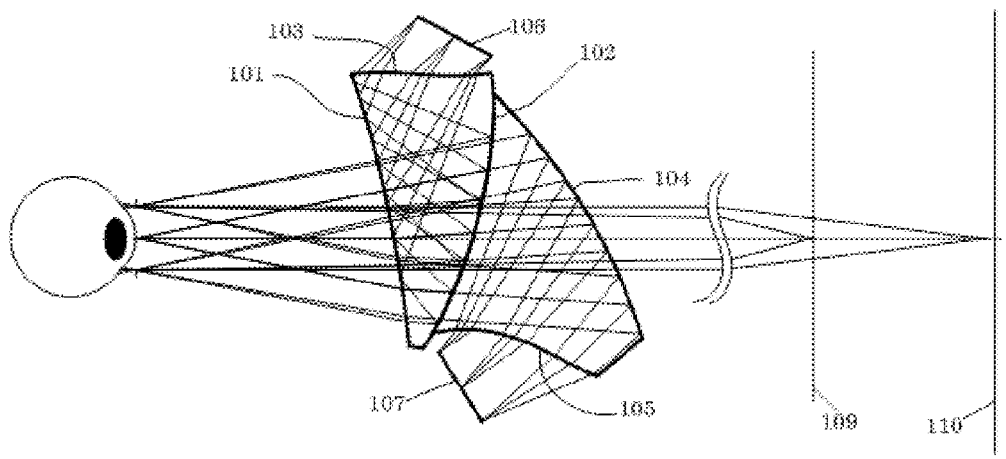
FIG. 11 is a synthetic diagram of the optical system according to the first embodiment.

According to one embodiment of the disclosure, the structure of the bifocal monocular three-dimensional HMD apparatus is shown in FIG. 11. It includes two optical surface prisms and two microdisplays, forming two different observation planes of different depths, respectively. When rendering the images on the microdisplays, appropriate light intensity filters need to be used. This can allow users to feel the observed images between screen 109 and 110, thereby produces the three-dimensional display effect with a certain depth.

An optical system including the first focal plane can have its optical path formed as follows. The optical path of the first focal plane can include optical surfaces 101, 102 and 103, the inside cavity can be filled with glass or other materials. According to the description of reverse ray tracing, the light starts from the user's eyes located at the exit pupil, travels from the front surface of the optical surface 101 and transmits through it, and arrives at the optical surface 102. Because a semi-permeable membrane is coated on optical surface 102, the light splits into two beams. After the light beam reflection occurs, it is incident on this surface again from the back of optical surface 101. The light undergoes a total reflection, reaches optical surface 103, eventually leaves the wedge prism through transmission, and arrives at micro-display 106. The viewing screen corresponding to the image plane 107 is located at the position 110. Table 1 lists the eccentricity and inclination angles of each optical surface for generating the focal plane in a first embodiment. Table 3 lists the parameters of all surfaces according to the first embodiment.

TABLE 1

| Surface No. | Eccentricity in Y direction | Eccentricity in Z direction | Inclination on the X-axis |
|---|---|---|---|
| 101 | −4.000 | 28.660 | 11.500 |
| 102 | 1.000 | 36.840 | −13.900 |
| 103 | 18.050 | 31.000 | 87.000 |
| 106 | 22.555 | 36.352 | 56.858 |

The optical path of the optical system including the second focal plane can be formed as follows. The optical path of the second view screen can include optical surfaces 101, 102, 104, and 105. The light coming from the human eye transmits through optical surface 101, undergoes a reflection on optical surface 104, the reflected light transmits through optical surface 105, and reaches the second image plane 107. The viewing screen corresponding to the image plane 107 is located at position 109. Table 2 lists the eccentricity and inclination values of each optical for generating the second focal plane of the optical path according to the first embodiment.

TABLE 2

| Surface No. | Eccentricity in Y direction | Eccentricity in Z direction | Inclination on the X-axis |
|---|---|---|---|
| 101 | −4.000 | 28.660 | 11.500 |
| 102 | 1.000 | 36.840 | −13.900 |
| 104 | 8.447 | 44.853 | 37.003 |
| 105 | −10.000 | 32.484 | 99.327 |
| 107 | −14.893 | 34.122 | 26.580 |

TABLE 3

| Coefficient | 101 | 102 | 103 | 104 | 105 |
|---|---|---|---|---|---|
| Radius in YZ plane (cuy) | −3.16E+02 | −6.30E+01 | −8.35E+02 | −6.33E+01 | −1.63E+01 |
| Conic constant in X (Kx) | 0 | 0 | 0 | 0 | 0 |

TABLE 3-continued

| Coefficient | 101 | 102 | 103 | 104 | 105 |
|---|---|---|---|---|---|
| Conic constant in Y (Ky) | 0 | 0 | 0 | 0 | 0 |
| Radius in XZ plane (cux) | −3.62E+02 | −4.79E+01 | −6.26E+02 | −4.89E+01 | −2.72E+01 |
| x | 0 | 0 | 0 | 0 | 0 |
| y | 7.95E−08 | 7.13E−09 | −8.26E−12 | 0 | 0 |
| x2 | −6.69E−04 | −8.71E−04 | −4.43E−04 | 0 | 0 |
| xy | 0 | 0 | 0 | 0 | 0 |
| y2 | −1.53E−09 | 3.25E−04 | 3.14E−03 | 0 | 0 |
| x3 | 0 | 0 | 0 | 0 | 0 |
| x2y | 1.96E−10 | −3.87E−06 | −1.91E−04 | 0 | 0 |
| xy2 | 0 | 0 | 0 | 0 | 0 |
| y3 | 3.42E−10 | 6.10E−05 | 3.33E−04 | 0 | 0 |
| x4 | −7.44E−06 | −2.89E−06 | 6.85E−05 | −8.89E−07 | 1.17E−05 |
| x3y | 0 | 0 | 0 | 0 | 0 |
| x2y2 | −9.63E−06 | 8.85E−07 | 1.15E−04 | −1.58E−06 | −5.61E−05 |
| xy3 | 0 | 0 | 0 | 0 | 0 |
| y4 | −3.12E−06 | 2.35E−06 | 6.07E−05 | −7.02E−07 | 6.73E−05 |
| x5 | 0 | 0 | 0 | 0 | 0 |
| x4y | −2.23E−13 | 1.83E−07 | −7.16E−06 | 0 | 0 |
| x3y2 | 0 | 0 | 0 | 0 | 0 |
| x2y3 | 1.35E−12 | −6.00E−09 | 9.25E−06 | 0 | 0 |
| xy4 | 0 | 0 | 0 | 0 | 0 |
| y5 | −1.07E−11 | −1.24E−07 | −1.09E−05 | 0 | 0 |
| x6 | 7.64E−09 | 4.32E−09 | −9.13E−07 | −1.92E−17 | 3.18E−08 |
| x5y | 0 | 0 | 0 | 0 | 0 |
| x4y2 | 2.15E−08 | −2.91E−09 | 1.62E−06 | 2.71E−14 | −1.33E−07 |
| x3y3 | 0 | 0 | 0 | 0 | 0 |
| x2y4 | 2.02E−08 | −1.49E−08 | −7.35E−07 | −1.28E−11 | 1.85E−07 |
| xy5 | 0 | 0 | 0 | 0 | 0 |
| y6 | 6.33E−09 | −1.42E−08 | −1.08E−06 | 2.00E−09 | −8.56E−08 |
| x7 | 0 | 0 | 0 | 0 | 0 |
| x6y | −4.09E−16 | −4.63E−10 | 2.22E−07 | 0 | 0 |
| x5y2 | 0 | 0 | 0 | 0 | 0 |
| x4y3 | 1.79E−15 | −3.87E−10 | −2.23E−07 | 0 | 0 |
| x3y4 | 0 | 0 | 0 | 0 | 0 |
| x2y5 | 2.55E−15 | 6.10E−10 | −1.54E−07 | 0 | 0 |
| xy6 | 0 | 0 | 0 | 0 | 0 |
| y7 | −2.52E−14 | 2.10E−11 | 8.47E−08 | 0 | 0 |
| x8 | 6.74E−12 | −5.03E−12 | 8.29E−09 | −4.18E−12 | −6.03E−09 |
| x7y | 0 | 0 | 0 | 0 | 0 |
| x6y2 | 1.98E−11 | 1.80E−11 | −2.83E−08 | −1.56E−12 | 1.02E−08 |
| x5y3 | 0 | 0 | 0 | 0 | 0 |
| x4y4 | 2.19E−11 | −1.28E−11 | 1.09E−08 | −2.17E−13 | −6.51E−09 |
| x3y5 | 0 | 0 | 0 | 0 | 0 |
| x2y6 | 1.07E−11 | 2.86E−11 | −9.24E−09 | −1.35E−14 | 1.84E−09 |
| xy7 | 0 | 0 | 0 | 0 | 0 |
| y8 | 1.97E−12 | 3.95E−11 | 1.06E−08 | −3.14E−16 | −1.95E−10 |
| x9 | 0 | 0 | 0 | 0 | 0 |
| x8y | 2.01E−19 | 9.48E−13 | −1.82E−09 | 0 | 0 |
| x7y2 | 0 | 0 | 0 | 0 | 0 |
| x6y3 | −6.37E−19 | 4.17E−12 | 2.58E−09 | 0 | 0 |
| x5y4 | 0 | 0 | 0 | 0 | 0 |
| x4y5 | −6.59E−19 | −3.63E−12 | −6.26E−10 | 0 | 0 |
| x3y6 | 0 | 0 | 0 | 0 | 0 |
| x2y7 | 3.53E−18 | 1.01E−12 | 1.54E−09 | 0 | 0 |
| xy8 | 0 | 0 | 0 | 0 | 0 |
| y9 | 7.18E−19 | 1.42E−12 | −1.14E−09 | 0 | 0 |
| x10 | −4.00E−15 | 4.19E−20 | 1.63E−20 | −4.08E−18 | −3.83E−15 |
| x9y | 0 | 0 | 0 | 0 | 0 |
| x8y2 | −2.37E−14 | −2.89E−20 | 9.01E−21 | −9.25E−17 | 7.11E−14 |
| x7y3 | 0 | 0 | 0 | 0 | 0 |
| x6y4 | −5.63E−14 | 9.02E−20 | 6.85E−20 | −8.38E−16 | −5.27E−13 |
| x5y4 | 0 | 0 | 0 | 0 | 0 |
| x4y6 | −6.67E−14 | −1.07E−19 | 1.94E−20 | −3.80E−15 | 1.96E−12 |
| x3y7 | 0 | 0 | 0 | 0 | 0 |
| x2y8 | −3.96E−14 | 7.06E−20 | 2.90E−20 | −8.61E−15 | −3.63E−12 |
| xy9 | 0 | 0 | 0 | 0 | 0 |
| y10 | −9.39E−15 | −3.36E−20 | 2.88E−20 | −7.80E−15 | 2.69E−12 |

Figure 12:
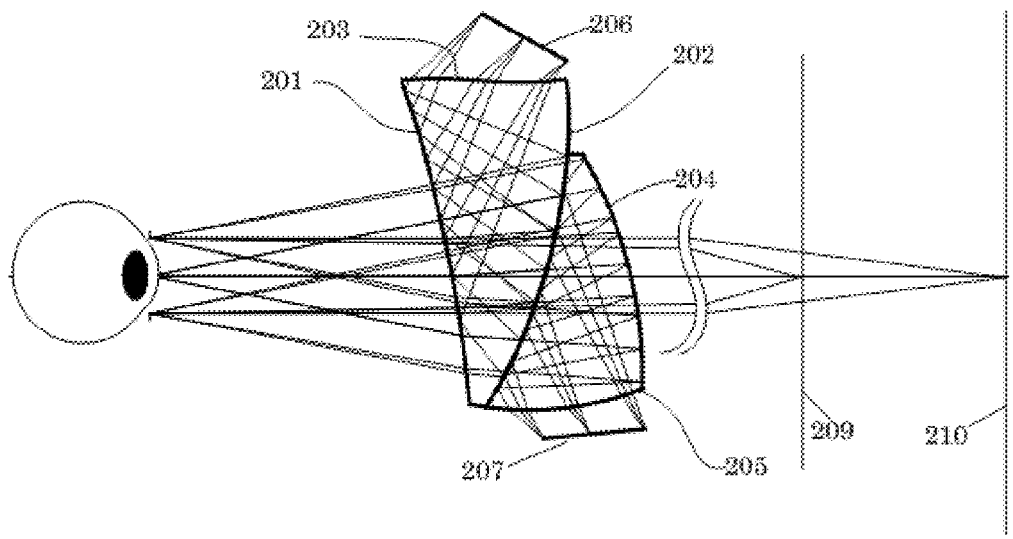
FIG. 12 is a synthetic diagram of the optical system according to the second embodiment.

*xmyn: indicates that the term is the m-th power term of x multiplied by the n-th power term of y According to some embodiments, the structure of the bifocal monocular three-dimensional HMD apparatus is shown in FIG. 12. It includes two optical surface prisms and two micro-displays, forming two viewing planes of different depths, respectively.

The optical system including the first focal plane can have its optical path formed as follows. The optical path of the first focal plane can include optical surfaces 201, 202 and 203, the inside cavity formed therefrom can be filled with glass or other materials. According to the description for the reverse ray tracing, the light starts from the users' eye located at the exit pupil, travels from the front surface of the optical surface 201, transmits through it, and arrives at the optical surface 202. Because a semi-permeable membrane is coated on optical surface 202, the light splits into two beams. After the light beam reflection occurs, it is incident on this surface again from the back of optical surface 201. The light undergoes a total reflection, then is incident on optical surface 203, leaves the wedge prism through transmission, and eventually arrives at microdisplay 206. The viewing screen corresponding to the image plane 207 is located at position 210. Table 4 lists the eccentricity and inclination angles of each optical surface for the first focal plane of the optical path according to a second embodiment. Table 6 lists the parameters of all surfaces according to the second embodiment.

The optical path of the optical system including the second focal plane can be formed as follows. The optical path of the second view screen can include optical surfaces 201, 202, 204, and 205. The light coming from the human eye transmits through the optical surface 201, has a reflection on surface 204. The reflected light transmits through optical surface 205 and reaches the second image plane 207. The viewing screen corresponding to the image plane 207 is located at position 209. Table 5 lists the eccentricity and inclination angles of each optical surface for the second focal plane of the optical path according to the second embodiment.

TABLE 4

| Surface No. | Eccentricity in Y direction | Eccentricity in Z direction | Inclination on X-axis |
|---|---|---|---|
| 201 | 4.610 | 27.313 | 11.900 |
| 202 | −3.810 | 35.625 | −20.874 |
| 203 | 18.300 | 28.482 | 87.285 |
| 206 | 22.185 | 34.983 | 61.351 |

TABLE 5

| Surface No. | Eccentricity in Y direction | Eccentricity in Z direction | Inclination on X-axis |
|---|---|---|---|
| 201 | 4.610 | 27.313 | 11.900 |
| 202 | −3.810 | 35.625 | −20.874 |
| 204 | −13.695 | 45.936 | −8.107 |
| 205 | −12.464 | 35.094 | −90.674 |
| 207 | −15.081 | 37.723 | −84.415 |

TABLE 6

| Coefficient | 201 | 202 | 203 | 204 | 205 |
|---|---|---|---|---|---|
| Radius in YZ plane (cuy) | 8.34E+17 | −5.60E+01 | −1.63E+02 | −3.55E+01 | −2.98E+01 |
| Conic constant in X (Kx) | 0 | 0 | 0 | 0 | 0 |
| Conic constant in Y (Ky) | 0 | 0 | 0 | 0 | 0 |
| Radius in XZ plane (cux) | −1.91E+02 | −6.31E+01 | −1.23E+02 | −3.32E+01 | −1.11E+02 |
| x | 0 | 0 | 0 | 0 | 0 |
| y | −6.08E−03 | 4.01E−09 | 2.68E−10 | −3.93E−02 | −6.59E−11 |
| $x^2$ | −5.88E−03 | −2.13E−03 | 1.53E−02 | 6.28E−04 | 9.02E−03 |
| xy | 0 | 0 | 0 | 0 | 0 |
| $y^2$ | −2.97E−03 | −4.04E−04 | −7.21E−03 | 3.39E−03 | 2.57E−10 |
| $x^3$ | 0 | 0 | 0 | 0 | 0 |
| $x^2y$ | 8.51E−05 | 1.15E−04 | 1.04E−03 | −1.88E−05 | 5.56E−12 |
| $xy^2$ | 0 | 0 | 0 | 0 | 0 |
| $y^3$ | −2.01E−05 | 6.52E−05 | −1.80E−03 | −1.12E−04 | −1.51E−13 |
| $x^4$ | −3.24E−06 | −1.51E−06 | 4.39E−05 | −1.16E−07 | 1.84E−07 |
| $x^3y$ | 0 | 0 | 0 | 0 | 0 |
| $x^2y^2$ | −6.04E−06 | −8.26E−06 | 3.25E−04 | 1.04E−05 | 2.55E−06 |
| $xy^3$ | 0 | 0 | 0 | 0 | 0 |
| $y^4$ | −5.11E−06 | −5.66E−06 | −2.15E−05 | 2.36E−06 | −2.29E−11 |
| $x^5$ | 0 | 0 | 0 | 0 | 0 |
| $x^4y$ | −4.49E−07 | −4.49E−09 | 1.60E−05 | 2.50E−08 | −8.37E−14 |
| $x^3y^2$ | 0 | 0 | 0 | 0 | 0 |
| $x^2y^3$ | 1.05E−06 | 4.31E−07 | 5.09E−06 | −3.76E−07 | −1.30E−13 |
| $xy^4$ | 0 | 0 | 0 | 0 | 0 |
| $y^5$ | −5.56E−08 | 8.95E−08 | 9.67E−06 | 4.68E−08 | 1.65E−14 |
| $x^6$ | 3.82E−08 | 6.32E−09 | −4.05E−07 | 1.04E−08 | 7.41E−12 |
| $x^5y$ | 0 | 0 | 0 | 0 | 0 |
| $x^4y^2$ | −4.74E−08 | −1.03E−08 | −1.23E−07 | −1.03E−08 | 2.07E−10 |
| $x^3y^3$ | 0 | 0 | 0 | 0 | 0 |
| $x^2y^4$ | 5.25E−08 | 2.30E−09 | −1.83E−06 | −7.32E−09 | 1.44E−09 |
| $xy^5$ | 0 | 0 | 0 | 0 | 0 |
| $y^6$ | −2.10E−10 | 8.79E−09 | 4.54E−06 | −1.16E−09 | 6.53E−13 |
| $x^7$ | 0 | 0 | 0 | 0 | 0 |
| $x^6y$ | 3.56E−16 | −5.41E−10 | 2.97E−07 | −3.54E−10 | 6.04E−16 |
| $x^5y^2$ | 0 | 0 | 0 | 0 | 0 |
| $x^4y^3$ | 3.57E−17 | 8.41E−10 | −2.00E−07 | 4.86E−10 | 1.94E−15 |
| $x^3y^4$ | 0 | 0 | 0 | 0 | 0 |
| $x^2y^5$ | −1.88E−16 | −7.22E−10 | 2.27E−07 | 1.20E−10 | 7.15E−16 |
| $xy^6$ | 0 | 0 | 0 | 0 | 0 |
| $y^7$ | 1.30E−15 | 1.17E−09 | 9.45E−07 | −2.53E−11 | −4.28E−17 |
| $x^8$ | −1.65E−16 | 7.48E−12 | 2.63E−09 | −4.68E−11 | 9.82E−16 |
| $x^7y$ | 0 | 0 | 0 | 0 | 0 |
| $x^6y^2$ | 4.44E−17 | 8.04E−12 | 1.18E−08 | −1.29E−11 | 1.61E−14 |
| $x^5y^3$ | 0 | 0 | 0 | 0 | 0 |

TABLE 6-continued

| Coefficient | 201 | 202 | 203 | 204 | 205 |
|---|---|---|---|---|---|
| x4y4 | −3.28E−17 | −6.70E−11 | 1.08E−08 | 2.17E−11 | 2.15E−13 |
| x3y5 | 0 | 0 | 0 | 0 | 0 |
| x2y6 | −2.48E−16 | −9.94E−11 | 5.95E−08 | 2.24E−11 | 9.90E−13 |
| xy7 | 0 | 0 | 0 | 0 | 0 |
| y8 | 3.17E−16 | −1.18E−10 | 8.32E−08 | 7.25E−13 | −7.49E−15 |
| x9 | 0 | 0 | 0 | 0 | 0 |
| x8y | 3.80E−20 | −2.99E−13 | −6.68E−09 | 8.90E−13 | −1.11E−18 |
| x7y2 | 0 | 0 | 0 | 0 | 0 |
| x6y3 | 6.89E−19 | 2.39E−12 | 1.90E−09 | 2.54E−12 | −7.36E−18 |
| x5y4 | 0 | 0 | 0 | 0 | 0 |
| x4y5 | 1.28E−18 | 1.65E−12 | 2.47E−09 | −7.41E−13 | −8.11E−18 |
| x3y6 | 0 | 0 | 0 | 0 | 0 |
| x2y7 | 4.26E−19 | 5.65E−12 | 2.57E−09 | 6.36E−13 | −2.00E−19 |
| xy8 | 0 | 0 | 0 | 0 | 0 |
| y9 | −4.08E−19 | 2.11E−12 | 2.60E−09 | 3.07E−14 | −3.97E−19 |
| x10 | −7.39E−19 | −1.02E−20 | −1.54E−18 | 1.13E−13 | −1.93E−18 |
| x9y | 0 | 0 | 0 | 0 | 0 |
| x8y2 | −5.90E−20 | 7.04E−20 | −7.96E−19 | 4.71E−14 | −3.02E−19 |
| x7y3 | 0 | 0 | 0 | 0 | 0 |
| x6y4 | 7.75E−19 | −9.30E−20 | −1.08E−18 | −1.22E−13 | 2.98E−17 |
| x5y4 | 0 | 0 | 0 | 0 | 0 |
| x4y6 | 3.23E−20 | 1.49E−20 | −8.84E−19 | −1.25E−14 | 2.91E−16 |
| x3y7 | 0 | 0 | 0 | 0 | 0 |
| x2y8 | −1.16E−19 | 3.81E−20 | 1.77E−18 | −4.88E−14 | 1.02E−15 |
| xy9 | 0 | 0 | 0 | 0 | 0 |
| y10 | −5.26E−19 | 4.05E−19 | −1.63E−18 | −3.77E−15 | 2.98E−17 |

Figure 13:
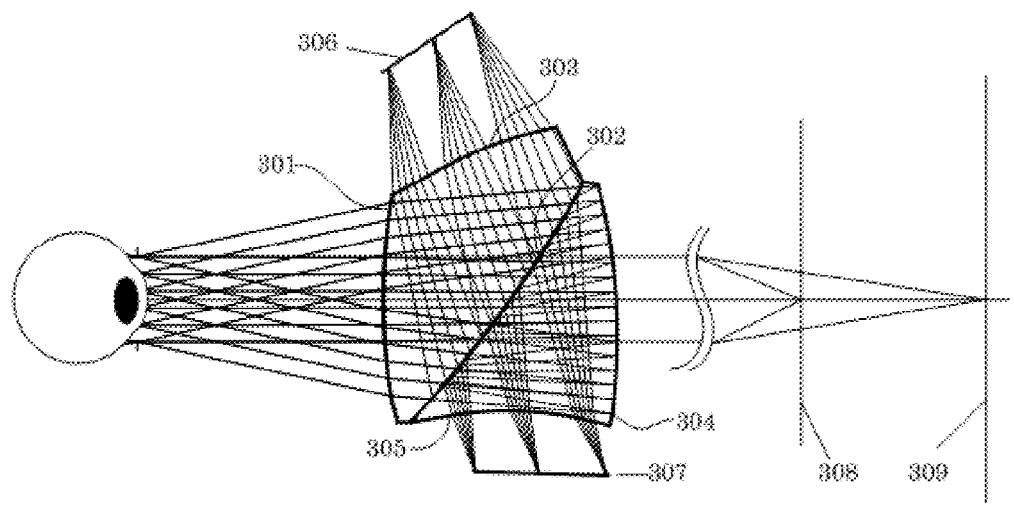
FIG. 13 is a synthetic diagram of the optical system according to the third embodiment.

According to one embodiment of the disclosure, the structure of the bifocal monocular three-dimensional HMD apparatus is shown in FIG. 13. It includes two optical surface prisms and two microdisplays, forming two viewing planes of different depths, respectively.

The optical system including the first focal plane can have its optical path formed as follows. The optical path of the first focal plane can include optical surfaces 301, 302 and 303, the inside cavity can be filled with glass or other materials. According to the description of the reverse ray tracing, the light starts from the exit pupil, travels from the front surface of optical surface 301, transmits through it, and arrives at the optical surface 302. Because a semi-permeable membrane is coated on optical surface 302, the light splits into two beams. One beam undergoes a reflection and it is incident on optical surface 303. It transmits through optical surface 303, leaves the wedge prism, and arrives at the microdisplay 306. The viewing screen corresponding to the microdisplay 306 is located at the position 308. Table 7 lists the eccentricity and inclination angles of each optical surface for the first focal plane of the optical path according to the third embodiment. Tables 9 and 10 list the parameters of all surfaces according to the third embodiment.

The optical system including the second focal plane can have its optical path formed as follows. The optical path of the second view screen can include optical surfaces 301, 302, 304, and 305. The light coming from the human eye transmits through optical surface 301 and it is incident on the optical surface 302 before it has another transmission. It travels to optical surface 304 before it has a reflection. The reflected light passes optical surface 302 and is reflected again before it reaches optical surface 305, it transmits through, and eventually reaches the microdisplay 307. The viewing screen corresponding to the microdisplay 307 is located at position 309. Table 8 lists the eccentricity and inclination angles of each optical surface for the second focal plane of the optical path according to the third embodiment.

TABLE 7

| Surface No. | Eccentricity Y direction | Eccentricity Z direction | Inclination on the X-axis |
|---|---|---|---|
| 301 | 0.000 | 17.413 | 0.000 |
| 302 | 0.000 | 26.665 | −35.631 |
| 303 | 10.757 | 24.903 | −69.446 |
| 306 | 22.903 | 27.997 | −56.746 |

TABLE 8

| Surface No. | Eccentricity Y direction | Eccentricity Z direction | Inclination on the X-axis |
|---|---|---|---|
| 301 | 0.000 | 17.413 | 0.000 |
| 302 | 0.000 | 26.665 | −35.631 |
| 304 | 4.279 | 33.618 | 24.825 |
| 305 | −7.989 | 29.319 | 83.401 |
| 307 | −12.220 | 27.168 | 88.299 |

TABLE 9

| | Surface No. | | | |
|---|---|---|---|---|
| | 301 | 302 | 304 | 305 |
| Radius of curvature | 40 | −84.1856 | −84.1856 | −25.498 |

TABLE 10

| Coefficient | 303 |
|---|---|
| Radius in YZ plane (cuy) | 1.95E+01 |
| Conic constant in X (Kx) | 0 |
| Conic constant in Y (Ky) | 0 |
| Radius in XZ plane (cux) | 1.03E+01 |
| x | 0 |
| y | 0 |
| x2 | 0 |
| xy | 0 |

TABLE 10-continued

| Coefficient | 303 |
|---|---|
| y2 | 0 |
| x3 | 0 |
| x2y | 0 |
| xy2 | 0 |
| y3 | 0 |
| x4 | −2.58E−04 |
| x3y | 0 |
| x2y2 | −4.37E−04 |
| xy3 | 0 |
| y4 | −1.85E−04 |
| x5 | 0 |
| x4y | 0 |
| x3y2 | 0 |
| x2y3 | 0 |
| xy4 | 0 |
| y5 | 0 |
| x6 | −1.70E−06 |
| x5y | 0 |
| x4y2 | −8.64E−07 |
| x3y3 | 0 |
| x2y4 | −1.47E−07 |
| xy5 | 0 |
| y6 | −8.30E−09 |
| x7 | 0 |
| x6y | 0 |
| x5y2 | 0 |
| x4y3 | 0 |
| x3y4 | 0 |
| x2y5 | 0 |
| xy6 | 0 |
| y7 | 0 |
| x8 | 2.64E−08 |
| x7y | 0 |
| x6y2 | 6.12E−08 |
| x5y3 | 0 |
| x4y4 | 5.32E−08 |
| x3y5 | 0 |
| x2y6 | 2.06E−08 |
| xy7 | 0 |
| y8 | 2.99E−09 |
| x9 | 0 |
| x8y | 0 |
| x7y2 | 0 |
| x6y3 | 0 |
| x5y4 | 0 |
| x4y5 | 0 |
| x3y6 | 0 |
| x2y7 | 0 |
| xy8 | 0 |
| y9 | 0 |
| x10 | −2.55E−10 |
| x9y | 0 |
| x8y2 | −6.35E−10 |
| x7y3 | 0 |
| x6y4 | −6.32E−10 |
| x5y4 | 0 |
| x4y6 | −3.14E−10 |
| x3y7 | 0 |
| x2y8 | −7.82E−11 |
| xy9 | 0 |
| y10 | −7.78E−12 |

Figure 14:
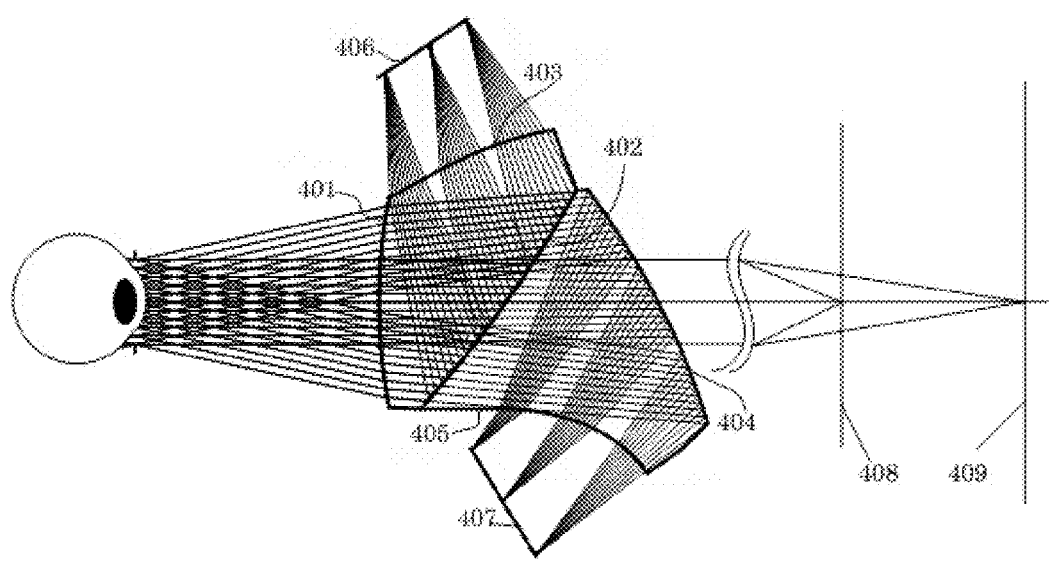
FIG. 14 is a synthetic diagram of the optical system according to the fourth embodiment.

According to some embodiments, the structure of the bifocal monocular three-dimensional HMD apparatus is shown in FIG. 14. It includes two optical surface prisms and two microdisplays, forming two viewing planes of different depths, respectively.

The optical system including the first focal plane can have its optical path formed as follows. The optical path of the first focal plane can include optical surfaces 401, 402 and 403. The inside cavity can be filled with glass or other materials. In accordance with description of the reverse ray tracing, the light starts from the exit pupil, travels from the front surface of optical surface 401, transmits through it, and arrives at optical surface 402. Because a semi-permeable membrane is coated on optical surface 302, the light splits into two beams. One light beam undergoes a reflection, and it is incident on optical surface 403. It transmits through optical surface 403, leaves the wedge prism, and arrives at microdisplay 406. The viewing screen corresponding to microdisplay 406 is located at a position 408. Table 11 lists the eccentricity and inclination angles for each optical surface for the first focal plane of the optical path according to the fourth embodiment. Tables 13 and 14 list the parameters of all surfaces according to the fourth embodiment.

The optical system including the second focal plane can have its optical path formed as follows. The optical path of the second view screen can include optical surfaces 401, 402, 404, and 405. The light coming from the human eyes transmits through the optical surface 401 before it is incident on optical surface 402 and has a reflection. The reflected light passes through optical surface 405 and reaches the second image plane 407. The viewing screen corresponding to the image plane 407 is located at position 409. Table 12 lists the eccentricity and inclination angles of the optical path for the second focal plane of the optical path according to the fourth embodiment.

TABLE 11

| Surface No. | Eccentricity in Y direction | Eccentricity in Z direction | Inclination on the X-axis |
|---|---|---|---|
| 401 | 0.000 | 17.413 | 0.000 |
| 402 | 0.000 | 26.665 | −35.631 |
| 403 | 10.757 | 24.903 | −69.446 |
| 406 | 22.903 | 27.997 | −56.746 |

TABLE 12

| Surface No. | Eccentricity in Y direction | Eccentricity in Z direction | Inclination on the X-axis |
|---|---|---|---|
| 401 | 0.000 | 17.413 | 0.000 |
| 402 | 0.000 | 26.665 | −35.631 |
| 404 | 4.723 | 34.715 | 23.246 |
| 405 | −7.578 | 27.366 | 86.117 |
| 407 | −13.777 | 26.116 | 31.371 |

TABLE 13

| | Surface No. | | |
|---|---|---|---|
| | 401 | 402 | 405 |
| Surface type | sph | sph | asp |
| Radius of curvature | 40 | −84.1856 | −18.53256112 |
| K | | | 0 |
| A4 | | | −6.71E−05 |
| A6 | | | −6.19E−08 |
| A8 | | | −2.30E−09 |
| A10 | | | −1.90E−11 |

TABLE 14

| Coefficient | 403 | 404 |
|---|---|---|
| Radius in YZ plane (cuy) | 19.46217052 | −50.37825638 |
| Conic constant in X (Kx) | 0 | 0 |
| Conic constant in Y (Ky) | 0 | 0 |

TABLE 14-continued

| Coefficient | 403 | 404 |
|---|---|---|
| Radius in XZ plane (cux) | 24.16525332 | −45.84629567 |
| x | 0 | 0 |
| y | −6.23E−11 | −0.169265848 |
| x2 | 1.37E−12 | −0.000189081 |
| xy | 0 | 0 |
| y2 | −5.67E−12 | 0.001687998 |
| x3 | 0 | 0 |
| x2y | −2.17E−13 | 3.85E−06 |
| xy2 | 0 | 0 |
| y3 | 3.29E−12 | 9.66E−06 |
| x4 | −0.00025809 | 6.83E−06 |
| x3y | 0 | 0 |
| x2y2 | −0.00043699 | −8.09E−06 |
| xy3 | 0 | 0 |
| y4 | −0.000184974 | 7.19E−06 |
| x5 | 0 | 0 |
| x4y | 3.19E−14 | 5.32E−07 |
| x3y2 | 0 | 0 |
| x2y3 | −4.12E−14 | 4.59E−07 |
| xy4 | 0 | 0 |
| y5 | −4.20E−14 | 1.52E−06 |
| x6 | −1.70E−06 | −1.73E−07 |
| x5y | 0 | 0 |
| x4y2 | −8.64E−07 | 2.41E−07 |
| x3y3 | 0 | 0 |
| x2y4 | −1.47E−07 | −5.23E−08 |
| xy5 | 0 | 0 |
| y6 | −8.30E−09 | 2.63E−08 |
| x7 | 0 | 0 |
| x6y | −1.93E−16 | 1.51E−09 |
| x5y2 | 0 | 0 |
| x4y3 | −2.24E−16 | −1.42E−08 |
| x3y4 | 0 | 0 |
| x2y5 | 7.68E−16 | −7.97E−09 |
| xy6 | 0 | 0 |
| y7 | 1.00E−16 | −6.48E−09 |
| x8 | 2.64E−08 | 1.84E−09 |
| x7y | 0 | 0 |
| x6y2 | 6.12E−08 | −2.10E−09 |
| x5y3 | 0 | 0 |
| x4y4 | 5.32E−08 | −1.95E−09 |
| x3y5 | 0 | 0 |
| x2y6 | 2.06E−08 | 7.12E−10 |
| xy7 | 0 | 0 |
| y8 | 2.99E−09 | −1.80E−10 |
| x9 | 0 | 0 |
| x8y | 1.13E−18 | −2.67E−11 |
| x7y2 | 0 | 0 |
| x6y3 | −5.67E−18 | 8.29E−11 |
| x5y4 | 0 | 0 |
| x4y5 | 9.47E−18 | −1.02E−10 |
| x3y6 | 0 | 0 |
| x2y7 | −7.50E−18 | 1.12E−10 |
| xy8 | 0 | 0 |
| y9 | 7.77E−19 | 1.58E−11 |
| x10 | −2.55E−10 | −7.07E−12 |
| x9y | 0 | 0 |
| x8y2 | −6.35E−10 | 7.67E−12 |
| x7y3 | 0 | 0 |
| x6y4 | −6.32E−10 | 4.63E−12 |
| x5y4 | 0 | 0 |
| x4y6 | −3.14E−10 | −2.06E−12 |
| x3y7 | 0 | 0 |
| x2y8 | −7.82E−11 | 3.42E−12 |
| xy9 | 0 | 0 |
| y10 | −7.78E−12 | 6.00E−13 |

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A wearable display apparatus, comprising:
a waveguide optical device;
a projection optical system including an optical free-form surface; and
a microdisplay device;
wherein the projection optical system is coupled to the waveguide optical device through an inclined optical path;
wherein the projection optical system comprises a prism having at least one optical free-form curved surface; and
wherein the free-form surface prism comprises at least three free-form curved surfaces, with non-overlapping exit pupil positions in two orthogonal directions, with a thickness ≤5 mm, and a width ≤10 mm.

2. The apparatus of claim 1, wherein the inclined light path is a non-rectangular light path.

3. The apparatus of claim 1, wherein the projection optical system comprises a light engine system and a free-form surface prism imaging system.

4. The apparatus of claim 3, wherein the light engine comprises a PBS beam splitter, a ¼ wave plate, a reflector, and an LED light source.

5. The apparatus of claim 1, wherein the waveguide optical device comprises a planar waveguide optical element having an input coupling end including a reflector, the input coupling end substantially overlapping with the free-form surface prism exit pupil, and wherein following conditions are satisfied to thereby reduce stray light:

$$0 \leq T_{exd} \leq d, \text{ optimally } T_{exd} = d \times \frac{\tan\omega'_y}{\tan\omega_y},$$

$$D_{exd} = 2d \times \frac{\tan\theta_i + \tan\theta_i \tan\omega'_y \tan\theta}{1 + \tan\theta\tan\theta_i}$$

wherein $\theta_i$ is the incident angle of light beam at the front or back surface of the waveguide optical element, $\omega_y$ is a largest field of view angle in a light pupil expansion direction, is a refractive angle of the largest field of view light beam in the light pupil expansion direction incident upon the waveguide optical element.

6. A method of displaying images with a wearable display apparatus, the method comprising:
generating images with a microdisplay device;
projecting the generated images with a projection optical system including an optical free-form surface; and
coupling the projected images to a waveguide optical device through an inclined optical path;
wherein the projection optical system comprises a prism having at least one optical free-form curved surface; and
wherein the free-form surface prism comprises at least three free-form curved surfaces, with non-overlapping exit pupil positions in two orthogonal directions, with a thickness ≤5 mm, and a width ≤10 mm.

7. The method of claim 6, wherein the inclined light path is a non-rectangular light path.

8. The method of claim 6, wherein the projection optical system comprises a light engine system and a free-form surface prism imaging system.

9. The method of claim 8, wherein the light engine comprises a PBS beam splitter, a ¼ wave plate, a reflector, and an LED light source.

10. The method of claim 6, wherein the waveguide optical device comprises a planar waveguide optical element having an input coupling end including a reflector, the input coupling end substantially overlapping with the free-form surface prism exit pupil, and wherein following conditions are satisfied to thereby reduce stray light:

$$0 \leq T_{exd} \leq d, \text{ optimally } T_{exd} = d \times \frac{\tan\omega'_y}{\tan\omega_y},$$

$$D_{exd} = 2d \times \frac{\tan\theta_i + \tan\theta_i \tan\omega'_y \tan\theta}{1 + \tan\theta\tan\theta_i}$$

wherein $\theta_i$ is the incident angle of light beam at the front or back surface of the waveguide optical element, $\omega_y$ is a largest field of view angle in a light pupil expansion direction, is a refractive angle of the largest field of view light beam in the light pupil expansion direction incident upon the waveguide optical element.

11. The method of claim 6, wherein the microdisplay device comprises:
a first and a second microdisplays, configured to display respectively a near and a far observation images relative to a user eye, or display respectively a far and a near observation images relative to the eye, wherein the first and second observation images being displayed have different distances to the user eye, but with substantially fields of view areas being covered, the first image weighted toward describing in a three-dimensional rendering of a scene an object having a nearer depth, the second imaged weighted toward describing in the three-dimensional rendering of the scene an object having a farther depth;
wherein the projection optical system comprises:
a first curved optical surface prism configured to magnify and place an image displayed by the first microdisplay at a distance relatively close to the user eye;
a second curved optical surface prism configured to magnify and place an image displayed by the first microdisplay at a distance relatively far from the user eye;
the first prism and the second prism surface include a pair of optical surfaces having same shape parameters but opposite signs, i.e., a second optical surface of the first prism and a first optical surface of the second prism, through the two surfaces glued together a seamless connection between the two prisms is achieved, wherein the connection is coated with a half-permeable membrane to achieve an integration of two focal plane images.

12. The method of claim 11, wherein the first prism comprises three optical free-form surfaces, wherein:
at least one light reflection occurs at one of the optical free-form surfaces, the second optical surface is a concave reflecting surface, a space surrounded by the three optical free-form surfaces is filled with glass or resin optical material having a refractive index greater than 1.4, the optical surfaces include one of a spherical surface, an aspherical surface, or a free-form surface such as a complex curvature XY polynomial surface;
light emitted from the first microdisplay enters into the first prism through the third optical surface, reflected by the first optical surface to the second optical surface, and reflected by the second optical surface and transmits through the first optical surface to the user eye.

13. A method of displaying images with a wearable display apparatus, the method comprising:
generating images with a microdisplay device;
projecting the generated images with a projection optical system including an optical free-form surface; and
coupling the projected images to a waveguide optical device through an inclined optical path;
wherein the waveguide optical device comprises a planar waveguide optical element comprising:
a rectangular prism input coupling end;
a dichroic mirror array output coupling end;
wherein parameters of the waveguide include:
a plate thickness d;
an angle $\theta$ between the dichroic mirror and a plane;
a distance h1 between the input coupling end and the output coupling end;
a distance h2 between dichroic mirrors of the array;
a glass refractive index n;
wherein of the waveguide device:
the dichroic mirror array has mirrors parallel to each other;
the angle $\theta$ satisfies $20° \leq \theta \leq 40°$;
the distance h2 between dichroic mirrors satisfies h2=d/tan($\theta$);
the refractive index n satisfies $1.4 \leq n \leq 1.8$;
the thickness d satisfies $1.4 \leq d \leq 3.6$ mm.

14. The method of claim 13, wherein the planar waveguide optical element output coupling end comprises at least two parallel dichroic mirrors.

15. The method of claim 13, wherein the planar waveguide optical element input coupling end comprises a reflector or a triangular prism.

16. The method of claim 13, wherein the projection optical system has a short exit pupil substantially overlapping with the input coupling end, and a long exit pupil substantially overlapping with an exit pupil of the waveguide device.

* * * * *